(12) United States Patent
Pfister et al.

(10) Patent No.: US 7,941,918 B2
(45) Date of Patent: May 17, 2011

(54) METHOD FOR ELECTRICALLY CONNECTING A STINGER INTO A NETWORK NODE

(75) Inventors: Steven C. Pfister, Dunwoody, GA (US); Dennis McLain, Duluth, GA (US); Lai Hoang, Suwanee, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 55 days.

(21) Appl. No.: 12/140,647

(22) Filed: Jun. 17, 2008

(65) Prior Publication Data

US 2008/0250638 A1    Oct. 16, 2008

Related U.S. Application Data

(62) Division of application No. 11/383,879, filed on May 17, 2006, now Pat. No. 7,669,323, which is a division of application No. 10/947,586, filed on Sep. 22, 2004, now Pat. No. 7,814,653, which is a division of application No. 10/319,128, filed on Dec. 13, 2002, now Pat. No. 6,811,447.

(60) Provisional application No. 60/340,403, filed on Dec. 14, 2001.

(51) Int. Cl.
*H01R 43/00*    (2006.01)

(52) U.S. Cl. ............. 29/857; 29/861; 439/700; 439/843

(58) Field of Classification Search ............ 29/857, 29/861, 867, 873; 439/138, 322, 585, 700, 439/843, 921
See application file for complete search history.

(56) References Cited

U.S. PATENT DOCUMENTS

| | | | |
|---|---|---|---|
| 5,681,187 A * | 10/1997 | Fukushima et al. | 439/700 |
| 5,696,864 A | 12/1997 | Smith et al. | |
| 5,975,951 A | 11/1999 | Burris et al. | |
| 6,129,597 A * | 10/2000 | Gresko | 439/824 |
| 6,390,829 B1 | 5/2002 | Rademacher | |
| 6,593,830 B2 | 7/2003 | Wu | |
| 6,811,447 B2 | 11/2004 | Pfister et al. | |
| 7,669,323 B2 | 3/2010 | Pfister et al. | |
| 7,814,653 B2 | 10/2010 | Pfister et al. | |

* cited by examiner

*Primary Examiner* — Thiem Phan
(74) *Attorney, Agent, or Firm* — Patent Capital Group

(57) ABSTRACT

A spring-loaded device is installed into a node housing at a predetermined location. The predetermined location is selected to correspond to another predetermined location into which a stinger may be installed. These predetermined locations on the node housing are selected to further correspond to a predetermined internal location of an RF interface connector. A conducting pin of the RF interface extends through a dielectric between a nail head shaped end, which provides electrical connection with the stinger projection, and an end soldered to a PCB of the amplifier. The amplifier may be installed and the node housing closed before the stinger and spring-loaded device are installed into the housing. This facilitates installation of the stinger into the housing without having to open the housing and remove the amplifier. External threads on the spring-loaded device facilitate installation thereof, but a unique torque is not required therefor.

7 Claims, 6 Drawing Sheets

METHOD FOR ELECTRICALLY CONNECTING A STINGER INTO A NETWORK NODE

CROSS REFERENCE TO RELATED APPLICATION

This application is a divisional application of U.S. patent application Ser. No. 11/383,879, filed May 17, 2006 now U.S. Pat. No. 7,669,323, which is a divisional application of U.S. patent application Ser. No. 10/947,586, filed Sep. 22, 2004 now U.S. Pat. No. 7,814,653, which is a divisional of Ser. No. 10/319,128, now U.S. Pat. No. 6,811,447, filed Dec. 13, 2002, which claims priority to U.S. Provisional Patent Application Ser. No. 60/340,403, filed Dec. 14, 2001, all of which are incorporated herein by reference.

FIELD OF THE INVENTION

This invention relates, generally, to communication networkshaving radio frequency ("RF") amplifiers, and, more particularly, to connections at network nodes.

BACKGROUND

As broadband networks continue to move from the experimental realm to the order of the day for network and service providers, the competition-driven need for providers to reduce costs of implementation increases proportionally. Community Antenna Television ("CATV") has traditionally relied on metallic coaxial ("coax") cabling to deliver video signals. The conductors that transport the signals through the network may be typically connected at various points within the network, such as head ends, or central offices, nodes and subscriber premise equipment ("SPE") devices. The conductors are typically connected at the various types of equipment with connectors that are typically designed to minimize signal loss and to have impedance that matches that of the conductor(s) being connected.

The nodes may include electrical devices that are located outdoors and may be aerially hung from a conductor strand. Whether a node is mounted inside a cabinet affixed to the ground, or installed aerially, a technician typically installs a stinger, a device known in the art for providing an RF connection through a penetration into a housing. The stinger may comprise a hollow metallic shell threaded on the outside, a center conductor and a dielectric interposed between the conductor and the inner surface of the shell. The center conductor projects axially from the stinger such that the device resembles a bee stinger, hence the name. There are various types and styles of stingers known in the art, some designed for lab testing and some designed for field-use. In a lab-test style stinger, the end opposing the projecting conductor typically has a RF terminal. The field-use stinger typically has a mechanism for capturing and transferring electrical signals to the shield and conductor of a coaxial cable. The stinger is threaded into the node housing penetration, which is typically threaded to receive the stinger. When the stinger is in the installed position, the conductor projection into the node housing is guided into a predetermined position. The stinger conductor is guided by a guide device that may include a narrow channel to locate the conductor such that the nail head of a threaded seizure connector device may contact the center conductor when the seizure connector is screwed into place towards the guide, the axis of the seizure connector being perpendicular to the stinger conductor. Moreover, the seizure connector is typically screwed into place with a predetermined torque, the torque value determined to cause the center conductor to be "seized," or clamped, between the nail head and a metallic button that is located on the surface of the guide device underneath the center conductor.

To guide an RF signal from the stinger conductor through the seizure connector, the nail head penetrates the seizure connector through a dielectric device and terminates with a conducting pin inside a barrel defined by the seizure connector. This forms the male end of an RF connector such that the center conductor penetrates a matching female RF connector affixed to an amplifier assembly that houses node-processing circuitry. Although this arrangement provides acceptable transfer of RF signal power into or out of a node, the process of installing a node or performing maintenance is cumbersome because the stinger must be installed before the seizure connector is screwed into place using a torque wrench.

The seizure connector is screwed into place before the amplifier is located within the housing and the connection between the network conductor and the node circuitry is made. Furthermore, if the torque value for installing the seizure connector is exceeded, the stinger center conductor may be deformed, possibly causing degradation of the transfer of the RF signal power from the stinger to the seizure connector. On the other hand, if the torque value is too low, the connection between the nail head of the seizure connector and the stinger conductor may not be sound, thus resulting in poor signal power transfer as well. In addition, even if the torque applied in installing the seizure connector is proper, the nail head surface, as well as the stinger conductor, may nevertheless become deformed. This is because the nail head is turning against the stationary stinger conductor as the force imparted to the conductor is increasing, thus gouging the contact surfaces, which may result in decreased transfer of signal power at RF signal frequencies.

To replace a stinger or remove a node, especially a node that is aerially hung from a strand, the amplifier, which may be secured into the node with a plurality of screws or other fasteners known in the art, must be removed. This typically requires opening the node housing, which may typically be a hinged, clamshell housing fastened with screws or other known fasteners. After the amplifier has been removed from the housing, the seizure connector is unscrewed so that the seizing, or clamping force, exerted by the seizure connector nail head towards stinger conductor and opposed by the guide button, is relieved so that the stinger can be unscrewed from the node housing.

Thus, there is a need for a method and system that reduces the number of steps for installing or removing a stinger from a node, thus resulting in a less cumbersome method of installing a node in a network. Furthermore, there is a need for a method and system for providing an even and constant exertion of force for maintaining contact between the stinger conductor and the nail head. There is also a need for a method and system for minimizing damage that may occur to the stinger conductor and nail head contact surface areas due to gouging as the seizure connector is screwed towards the stinger conductor.

SUMMARY

An objective of the invention is to provide a simplified method and system for seizing a stinger center conductor between a force exerting means and the end of a conducting pin, the pin being part of a connector means having an axis perpendicular to the axis of the center conductor, to facilitate transferring of electrical energy from the stinger to the connector.

It is another objective to provide a means of exerting said for such that a unique torque is not specified for providing contact between the stinger conductor and the pin. Furthermore, it is an object to provide a method and system for exerting said force in a substantially constant amount regardless of slight tolerance variations in the alignment among the stinger center conductor, the force exerting means and the pin of the connector.

It is yet another object to provide a method and system for exerting a force on the stinger conductor, thereby bringing it into contact with the center pin of the connector, but without gouging the surfaces of contact of the pin or the stinger conductor.

Generally described is a system for connecting an RF node into a network comprising means for electrically interfacing with a stinger signal conductor and means for exerting a resilient force opposing the interfacing means, the exerted force maintaining the stinger conductor in positive contact with the interface means. The exerting means may include a non-conductive plunger having a distal face for applying the exerted force towards the electrical interface means. A transition between the distal face and a side face of the plunger may be chamfered. The interface means may include a conductor button, also referred to as a nail head, for contacting the stinger conductor at a contact area, the button being at the end of a pin that functions as the center conductor through a dielectric.

The exerting means may be rigidly installed into a housing, the housing defining mounting holes for the exerting means and the stinger such that an axis of the exerting means and the interface means are coaxial. The interface means may be rigidly mounted and located to a circuit amplifier such that when the amplifier is installed into the housing, the stinger conductor may be interposed between the exerting means and the electrical interface means at a right angle to the axis of the opposing interface and exerting means when the stinger is installed into the housing.

Also generally described is a method for installing a node comprising the steps of rigidly attaching at a predetermined location on a circuit board of an amplifier an RF connector having an electrical interface, installing a stinger into a housing of the node and installing a force exerting means for resiliently forcing the center conductor of the stinger against the electrical interface of the RF connector. The amplifier may also be installed into the node housing before or after the exerting means has been installed.

A process to remove the node comprises the steps of partially removing the exerting means from the housing to reduce or remove the force exerted against the stinger conductor and removing the stinger from the housing. The amplifier may also be removed from the node housing if the exerting means has not been removed.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no specific metallic, plastic or other material, housing or chassis shape, or connector size, for example, is required to be used in the practicing of the present invention.

Figure 1:
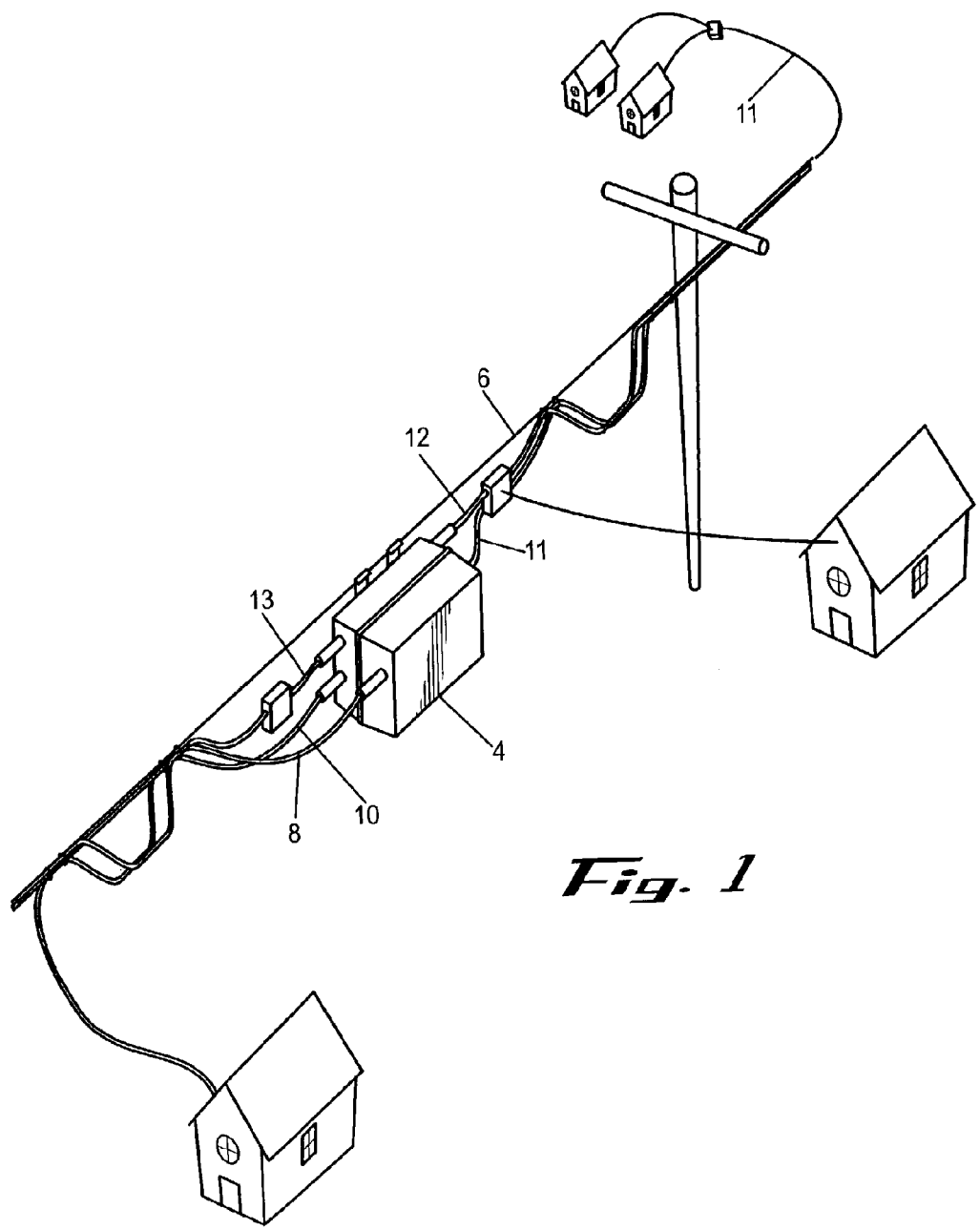
FIG. 1 illustrates a typical outdoor strand mounting of a node.

Turning now to the figures, FIG. 1 illustrates a typical architectural scenario 2 of a broadband network where a network node 4 is strand-mounted from a support wire 6. Cables 10, 11, 12 and 13 may typically be coaxial cables for transmitting RF signal information as well as AC power. Information signals may be provided to and transmitted from node 4 via multiple optical fiber inputs in line bundle 8 and returned to the network via output lines 10, 11, 12, and 13. Node 4 typically provides information signals to subscribers via subscriber drop line. Coaxial cables may each be connected to a connector means at the outside of the housing of node 4, the connector means typically passing the signal through a penetration in the outer wall of the housing. The connector means that passes are typically designed to provide a watertight seal, since node 4 is exposed to the elements, as opposed to merely passing a cable through a hole in the side of the housing and directly connecting the cable to a circuit board inside.

Figure 2:
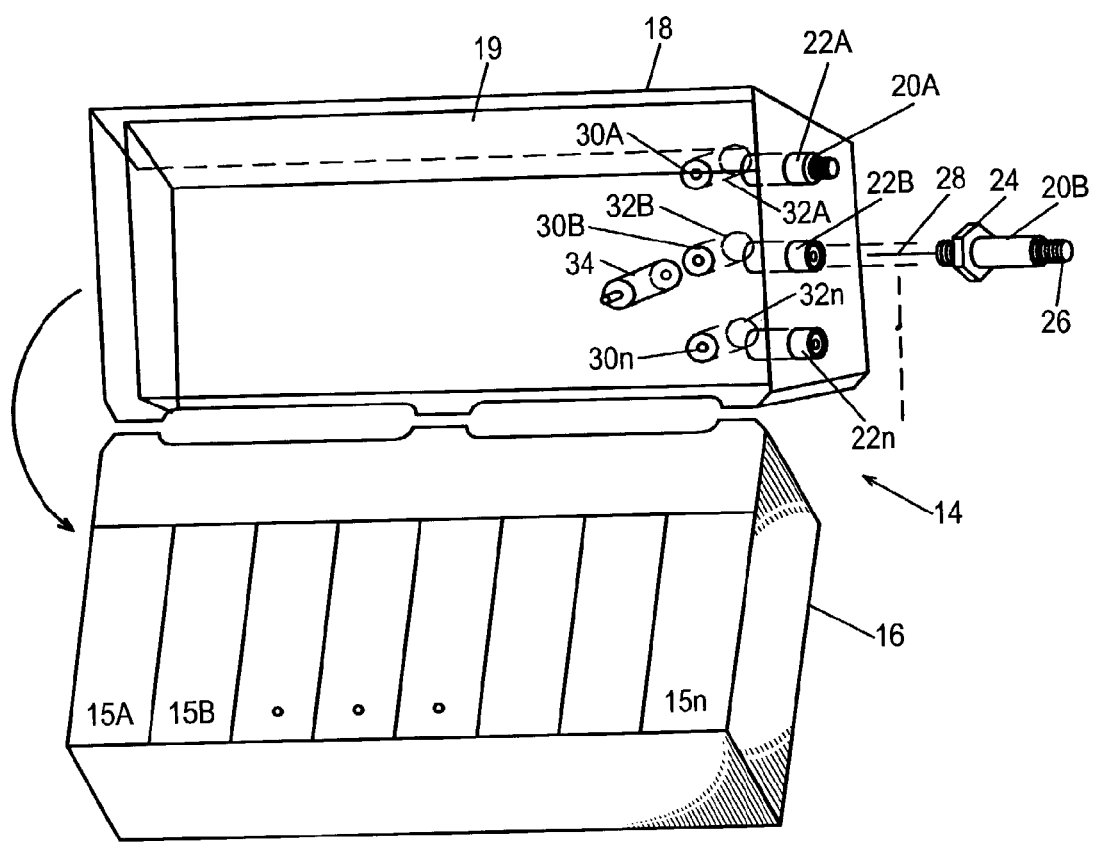
FIG. 2 illustrates a typical node housing with modules installed. Two stingers are shown, one installed and the other before installation.

Turning now to FIG. 2, a node housing 14 is shown in an open state. As shown in the drawing, housing 14 may typically be a hinged clamshell enclosing various components, such as modules 15 A-n, in the lower portion, or lid 16 of the housing. The upper portion 18, or base, of node housing 14 may typically contain an amplifier chassis 19 shown in the drawing as a chassis outline for clarity, the chassis typically being a rigid frame like structure for mounting a printed circuit board ("PCB"). The term "amplifier" and function thereof are known in the art and the PCB circuitry typically includes means for providing RF signal interface functionality. For example, this functionality may include separating or isolating a low frequency power supply signal from a high frequency RF signal, before the separated or isolated signals are further processed and then provided to or received from modules 15 and other circuitry contained in lid 16. It will be appreciated that only the outline of amplifier 19 is shown, although the edges hidden by base 18 are shown as dashed lines. Otherwise, as amplifier 19 would obscure their view, some items to be described hereafter in connection with FIG. 2 would have to be shown with dashed lines, thereby reducing clarity. Similarly, the PCB is not shown in the drawing for clarity so as not to obscure the view of items to be discussed hereafter. However, amplifier 19 as used in the illustrated embodiment may be thought of as a rectangular baking dish oriented so that the viewer of the figure is looking into the dish with the PCB being inside the dish, the bottom of the "amplifier" being oriented into the drawing when placed within base 18.

As discussed above, a watertight connection is provided to pass the RF and power signal from a coaxial line through node base 18. The signal typically penetrates base 18 via a stinger 20, stingers being known in the art. Stinger 20 may be threaded so that matching threads in port 22 receive the stinger, which may also locate a sealing o-ring or gasket between nut 24 and port 22. Stinger 10 typically has a capture and locking mechanism at network side 26 for transferring electrical signals to connecting lines, such as lines 10, 11, 12, and 13 shown in FIG. 1. The housing side of stinger 20 typically includes a center conductor 28 that transfers a non-grounded signal received at network side 26 to the inside of housing 14. The stinger conductor 28 is typically forced into contact with another connecting means inside housing 14, the other connecting means having an axis substantially perpendicular to the axis of stinger 20, which runs coaxially with center conductor 28. The other connecting means is typically part of a system of two assemblies, which will be described infra, the system being referred to as a seizure mechanism.

One of the assemblies, a force exerting means 30A-n, typically is installed into the into ports 32A-n of base 18. The force from exerting assembly 30 is opposed by an RF electrical interface means 34, which is typically mounted rigidly to a PCB that is located by amplifier chassis 19. Amplifier chassis 19 locates interface means 34 such that the coaxial axis of the interface means and exerting means 30 is substantially perpendicular to the axis of stinger 20, such that conductor 28 intersects said coaxial axis. It will be appreciated that there will typically be a like number of interface means 34 as there are exerting means 30 and stingers 20. However, only one interface means 34 is shown in FIG. 2 for clarity. Furthermore, all ports 22 and 32, and hence stingers 20 and exerting means 30 respectively, need not be located at one end of housing 16, as those skilled in the art can determine the best location of these items, based on particular installation needs. It will further be appreciated that housing 16 may be manufactured with a plurality of ports 22 and 32, in number greater than the number actually used, in which case the unused ports could be sealed with a blind plug known in the art, such as a port plug, for example.

Figure 3:
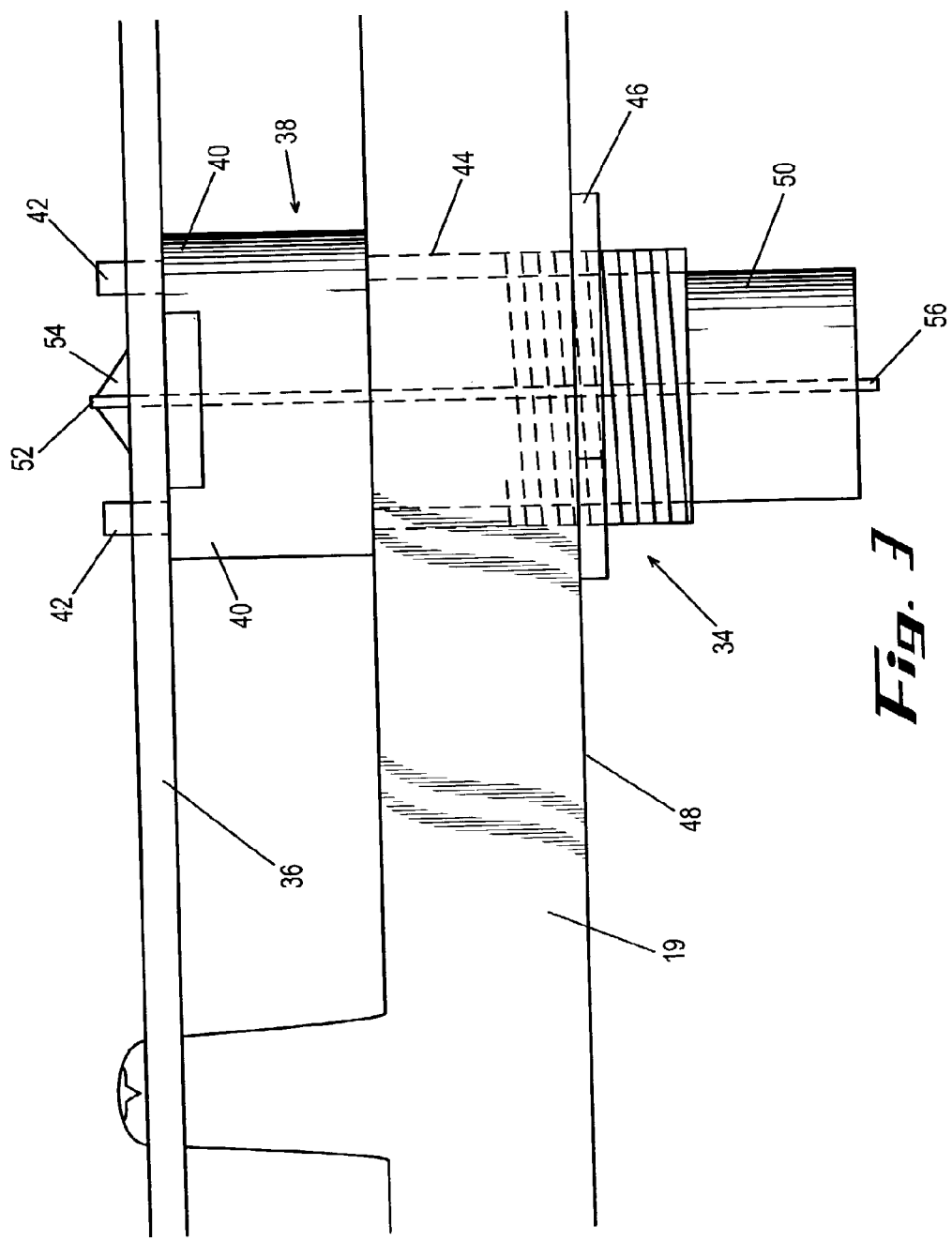
FIG. 3 illustrates an electrical interface aspect that penetrates an amplifier chassis and is attached to a printed circuit board.

Turning now to FIG. 3, the electrical interface means 34 of the connector system is illustrated in detail. The interface assembly 34 is attached to PCB 36, which is mounted to amplifier chassis 19. The body of interface 34 may typically be made out of a conducting material, such as brass, for example, and may comprise a castellated ring section 38, the castellations 40 defining PCB mounting prongs 42 projecting from said castellations. It will be appreciated that although two castellations 40 and prongs 42 are shown, the number of castellations (and prongs may be more or less than two.

The body of interface 34 further includes barrel 44, which extends from ring section 38. Barrel 44 extends from ring 38 to the extent that it passes through and beyond amplifier chassis 19. Furthermore, barrel 44 may typically be threaded around the outside to receive retaining nut 46. Thus, barrel 44 extends beyond outer face 48 of amplifier chassis 19 to provide enough threads for securing interface 34 and chassis 19 with nut 46. It is noted that the cross section of ring section 38, as well as nut 46 will typically be larger that the hole in chassis 19 through which barrel 44 passes. Thus, interface assembly 34 may be rigidly attached to chassis 19 for mechanical stability, and, in addition, to provide system ground interconnection from the chassis to the interface assembly. This also bolsters the ground interconnection between chassis 19 and PCB 36 if prongs 42 are attached to ground traces, such as with solder, for example.

To provide RF signal transfer, dielectric 50 is forcefully retained within barrel 44 and extends through and past the projected extent of the barrel. Within dielectric 50, conducting pin 52 is forcefully retained, and may be soldered to PCB 36 at solder ball 54. Conducting pin 52 extends past the dielectric projection approximately 0.125" for example, whereupon the pin flares slightly to create a nail head surface 56 that provides a contact surface for the stinger center conductor, as described above.

Figure 4:
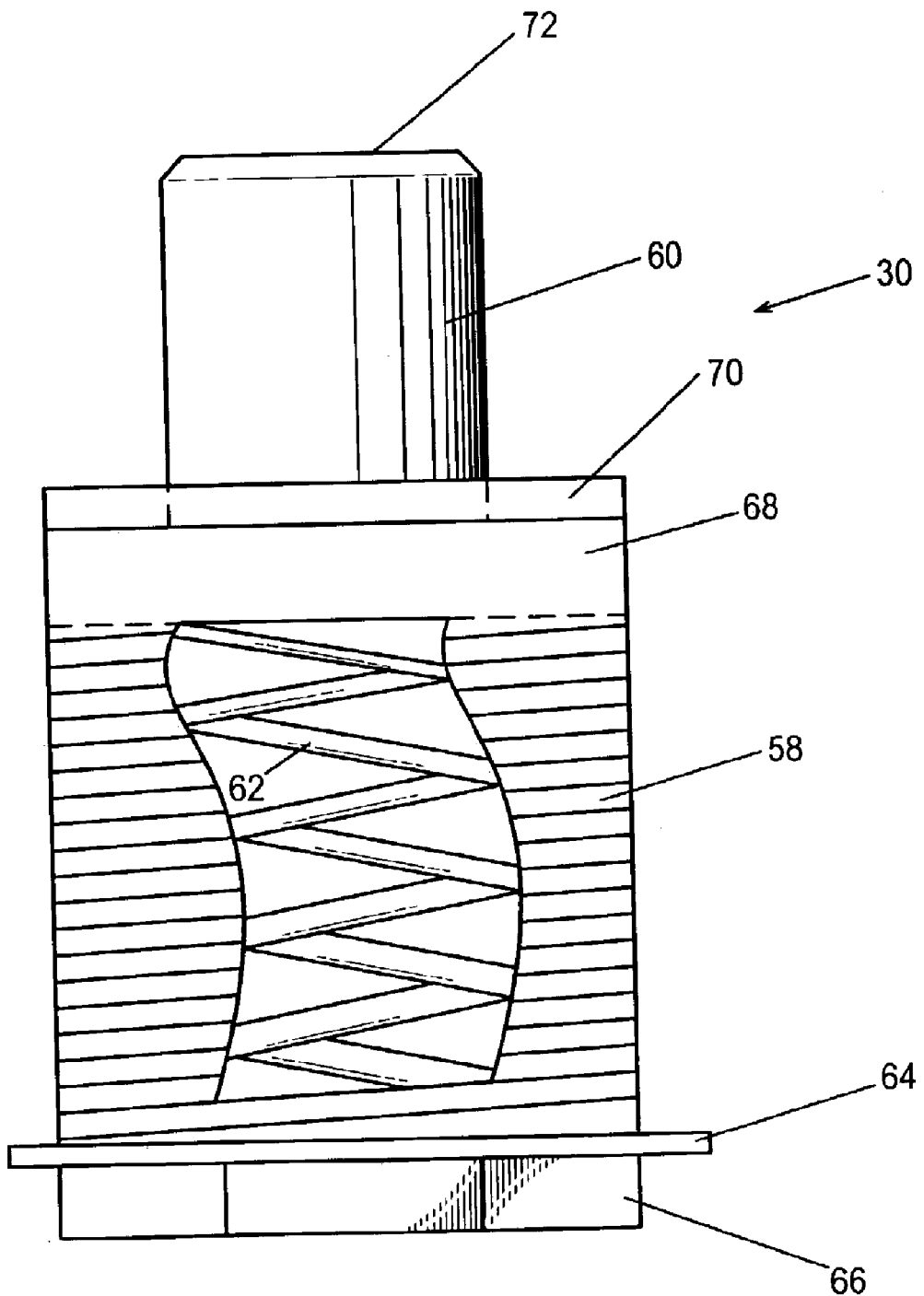
FIG. 4 illustrates a plunger aspect for forcing a stinger conductor into contact with an electrical interface aspect.

Turning now to FIG. 4, exerting means 30 is shown in the preferred embodiment as a plunger arrangement. The body of exerting means 30 includes barrel 58, plunger 60 and spring 62. Spring 62 is compressed within barrel 58 such that plunger 60 is motivated away from flange 64 and hexagonal head 66. Plunger 60 is restrained from being expelled from the barrel as plunger base 68 is forced into contact with stop lip 70. Barrel 58 is threaded so that after a stinger has been installed into a node housing, a technician may install the exerting means 30 into the node housing by turning hexagonal head 66 with a wrench. Application to exerting device 30 of a unique and specifically narrow unique torque value, or range of values, is not required when installing it to ensure that the force exerted against a stinger conductor is within a narrow range. This is because plunger 60 is spring loaded with spring 62, which is preferably a coil or other type of spring having a typically linear force versus displacement curve.

Thus, manufacturing tolerance of the distance between flange 64 and plunger end 72 need not be extremely precise to ensure that a predictable force is applied to the stinger conductor. If spring 62 is manufactured to have sufficient deflection (preferably on the order of approximately four or five times the diameter of the stinger center conductor, but can be more or less, depending upon criteria determined by one skilled in the art), a field technician may turn hexagonal head 66, which is rigidly connected to barrel 58, until flange 64 is stopped against the outside of the node housing. An additional quarter turn for example, may be applied to hexagonal head 66 to ensure that it is adequately seated against the housing. Thus, installation is quick and easy, without the requirement of using a torque wrench, or other special tools. The nominal excess deflection designed into the compression length of spring 62 compensates for differences in length between plunger end 72 and flange 64, as well as other slight manufacturing differences, such as, for example, the distance between the housing face against which flange 64 stops and the centerline of the penetration into which a stinger is installed.

Along with the even exertion of force provided by the spring loaded characteristic of plunger 60, chamfering of plunger end 72 may further facilitate installation of a stinger into a node for a new installation, or even an existing node upon which coaxial line maintenance is being performed. To reinstall the stinger, the plunger 60 will typically be loosened a few turns to provide clearance between plunger end 72 and the nail head.

Figure 5:
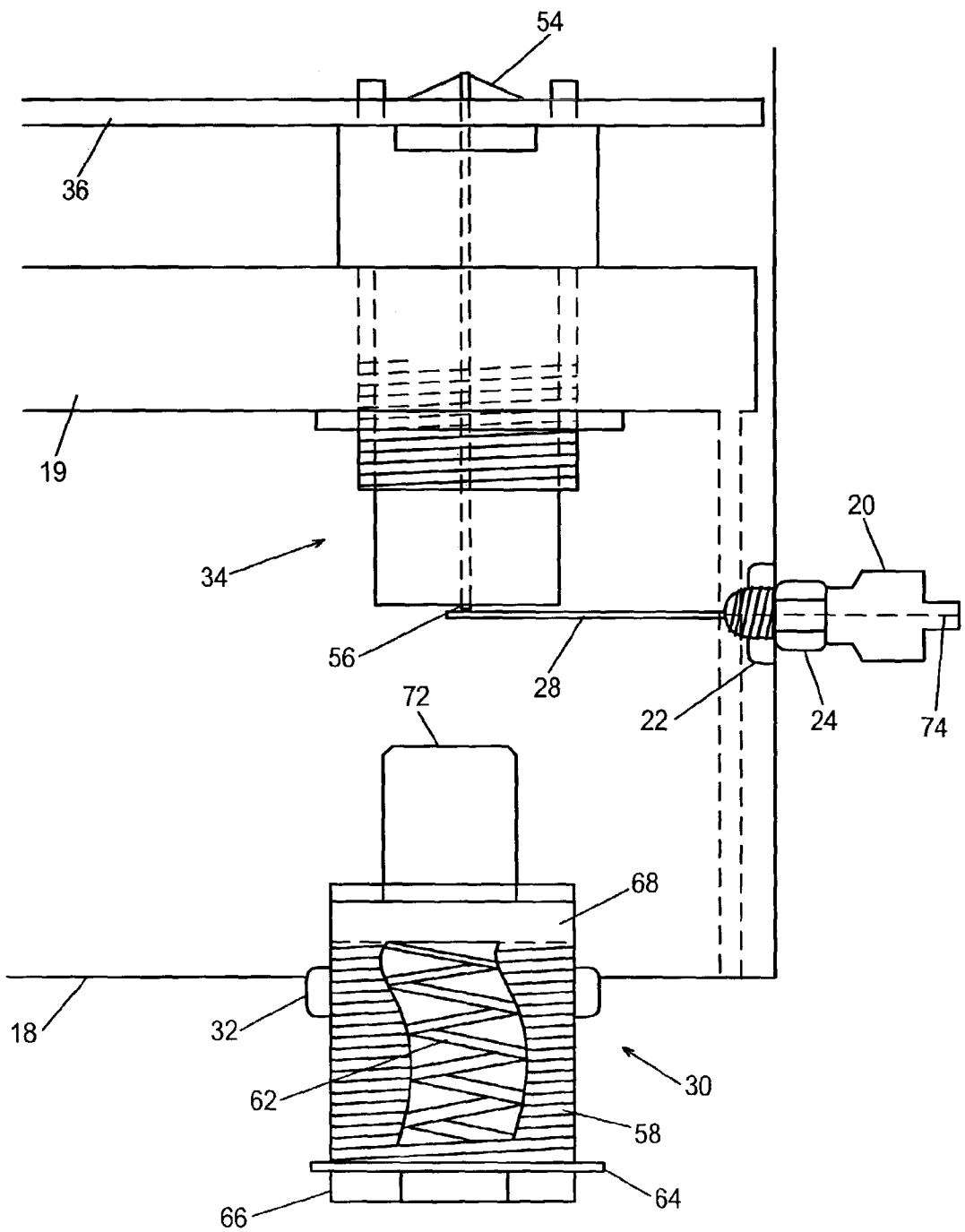
FIG. 5 illustrates an installation of as electrical interface and a plunger, the plunger partially installed, into a node housing before electrical contact between the electrical interface and a stinger center conductor is made.

Turning now to FIG. 5, housing base 18 is shown with amplifier assembly 19 and stinger 20 installed. Amplifier chassis 19 is shown with support legs dashed for clarity, although the legs would be as visible as the rest of the chassis as shown in the figure. Exerting device 30 is shown partially installed; it will be appreciated that as hexagonal head 66 is turned clockwise (for right hand threads), the exerting device will move closer and closer to interface 34 until plunger end 72 contacts stinger conductor 28. This contact forces stinger conductor 28 into contact with nail head 56 to result in electrical connection between RF path 74 of stinger 20 and solder ball 54 on PCB 54. After plunger 72 contacts conductor 28 and pushes it against nail head 56, turning of hexagonal head 66 may continue without damage occurring to the stinger center conductor, because spring 62 compresses as flange 64 moves closer to housing 16. If spring 62 is a properly designed coil spring, for example, its characteristics should obey Hooke's Law, which is $F=k \cdot x$. F is the force exerted by a linear spring, x is the amount of distance a spring has deflected from its rest state and k is known as the spring constant. If exerting device 30 is manufactured such that spring 62 is in a partially compressed state, a force in accordance with Hooke's Law will be exerted against plunger base 68 and flange 64, which is rigidly attached to barrel 58. This force may be referred to as the preload (P) of spring 62. Thus, the as-installed force equation representing the force exerted by plunger 72 when it forces conductor 28 into contact with nailhead 56 is $F=P+k \cdot x$.

If device 30 is manufactured such that k is low and preload P is less than the force that could cause damage to either conductor 28 or interface 34, then the force applied by plunger 72 will be essentially the preload force P regardless of how many turns of as hexagonal head 66 are used to bring flange stop 64 into contact with the node housing, the final position of the plunger for forcing the conductor into contact with nailhead 56. Those skilled in the art will appreciate that although the force will increase proportionally with deflection of spring 62 (caused by continued turning of hexagonal head 66 after plunger 72 has motivated conductor 28 into contact with nail head 56), if the spring constant k is kept low, the increase will be slight. Accordingly, for all practical purposes, the changes in force pushing conductor 28 against nail head 56 will be negligible as hexagonal head 66 is turned after plunger 72 contacts conductor 28 and conductor 28 subsequently contacts nail head 56.

Figure 6:
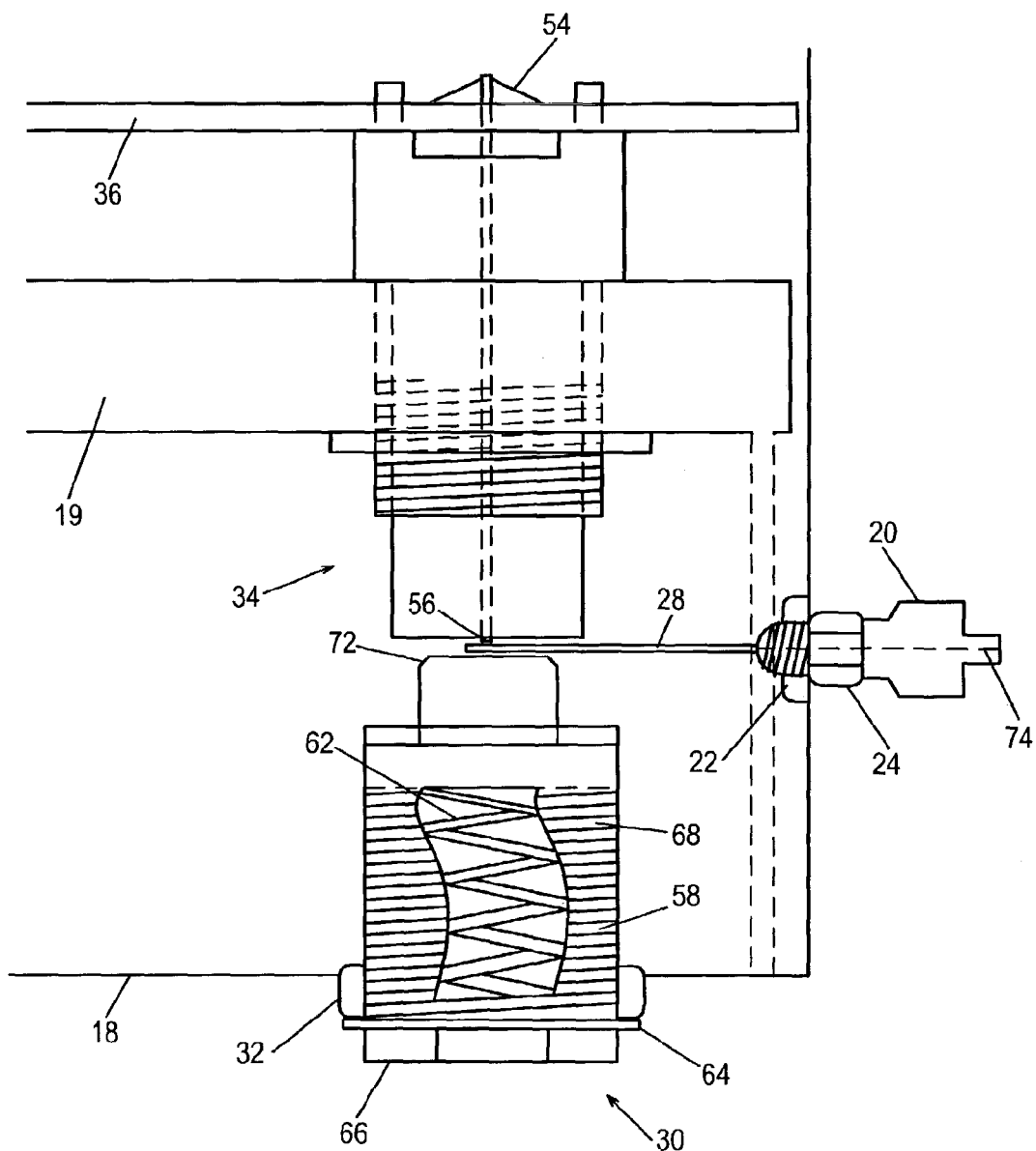
FIG. 6 illustrates an installation of as electrical interface and a plunger into a node housing such that electrical contact between the electrical interface and a stinger center conductor is made.

Turning now to FIG. 6, housing base 18 is shown with amplifier assembly 19 and stinger 20 installed. Exerting device 30 is shown fully installed with plunger 72 exerting force against conductor 28, the exerted force pushing conductor 28 against nail head 56. It is noted that hexagonal head 66 has been turned until flange 64 seated against port 32. It is also noted that plunger 72 extends a smaller distance beyond the top of device 30, and that plunger 68 (shown in dashed lines behind the threads of barrel 58) is recessed into the barrel, as compared to the same items as shown in FIG. 5. It is further noted that the coils of spring 62 are closer together, indicating that the spring has deflected to accommodate the seating of flange 64 against port 32. As discussed above, if spring 62 has a properly designed spring factor k, the force exerted by plunger 72 against conductor 28 will fall within a range between zero, when the plunger first contacts the conductor, and possibly up to a value slightly higher than preload P. Thus, regardless of manufacturing tolerances of the dimensional relationship between the centerline of port 22 and the plane of housing 18 in which port 32 lies, or the dimensional relationship of nail head 56 thereto, stinger 20 may be installed and reliably connected to the nail head by screwing exertion device 30 into port 32 until flange 64 bottoms thereon. Therefore, a field technician need not have to remove amplifier chassis 19 in order to install stinger 20 into housing 16, nor have to apply a predetermined torque to device 30 to ensure positive electrical contact between conductor 28 and nail head 56 while preventing damage from over tightening. Accordingly, time needed for a technician to install or maintain a node is reduced. The spring may also be designed not to exert too much force that would damage the stinger in the case that the amplifier is removed for maintenance while the plunger is still installed from the initial installation. This design provides an additional benefit to the technician when servicing the amplifier. The amplifier may be removed and replaced without removing the stinger from the housing.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method, comprising:
    installing a spring-loaded plunger through a port of a closed node housing of a network node to exert a force on a conductor of a stinger installed in the network node to forcibly bring the conductor of the stinger into electrical contact with an interface installed in the network node to establish an electrical interface and seize the conductor of the stinger within the network node, wherein the spring-loaded plunger is coupled to a spring provided within a barrel that is threaded such that after installation of the stinger into the node housing, the spring can be installed into the node housing by turning a head coupled to a flange, which is configured to seat against a surface of the node housing when the head is turned.

2. The method of claim 1 wherein the spring is four times a diameter of the conductor of the stinger, and wherein the spring exhibits a linear force distributed within the barrel.

3. The method of claim 2 wherein the force exerted on the center conductor of the stinger is equal to $P+k \cdot x$, wherein k is a spring constant of the spring and x is the distance the spring is deflected when installing the spring loaded plunger.

4. The method of claim 3 wherein the spring constant k is low so that the force exerted by the spring-loaded plunger on the conductor of the stinger is about equal to the preload P.

5. The method of claim 1, wherein the step of installing a spring-loaded plunger through the port of the closed node housing comprises:
    threading the spring loaded plunger into the port of the node housing; and
    torquing said spring-loaded plunger so that the spring-loaded plunger contacts said interface means and the spring compresses to exert a predictable force on the conductor of the stinger.

6. The method of claim 5 wherein the spring has a preload P of a value such that the maximum force exerted by the spring loaded plunger on the center conductor of the stinger is less than a force that will damage the conductor of the stinger.

7. The method of claim 1, wherein said spring has a deflection between four and five times a diameter of the conductor of the stinger.

* * * * *